C. W. HILLENBRAND.
SAFETY DEVICE FOR CRANKING EXPLOSIVE ENGINES.
APPLICATION FILED AUG. 12, 1909.
953,831.
Patented Apr. 5, 1910.
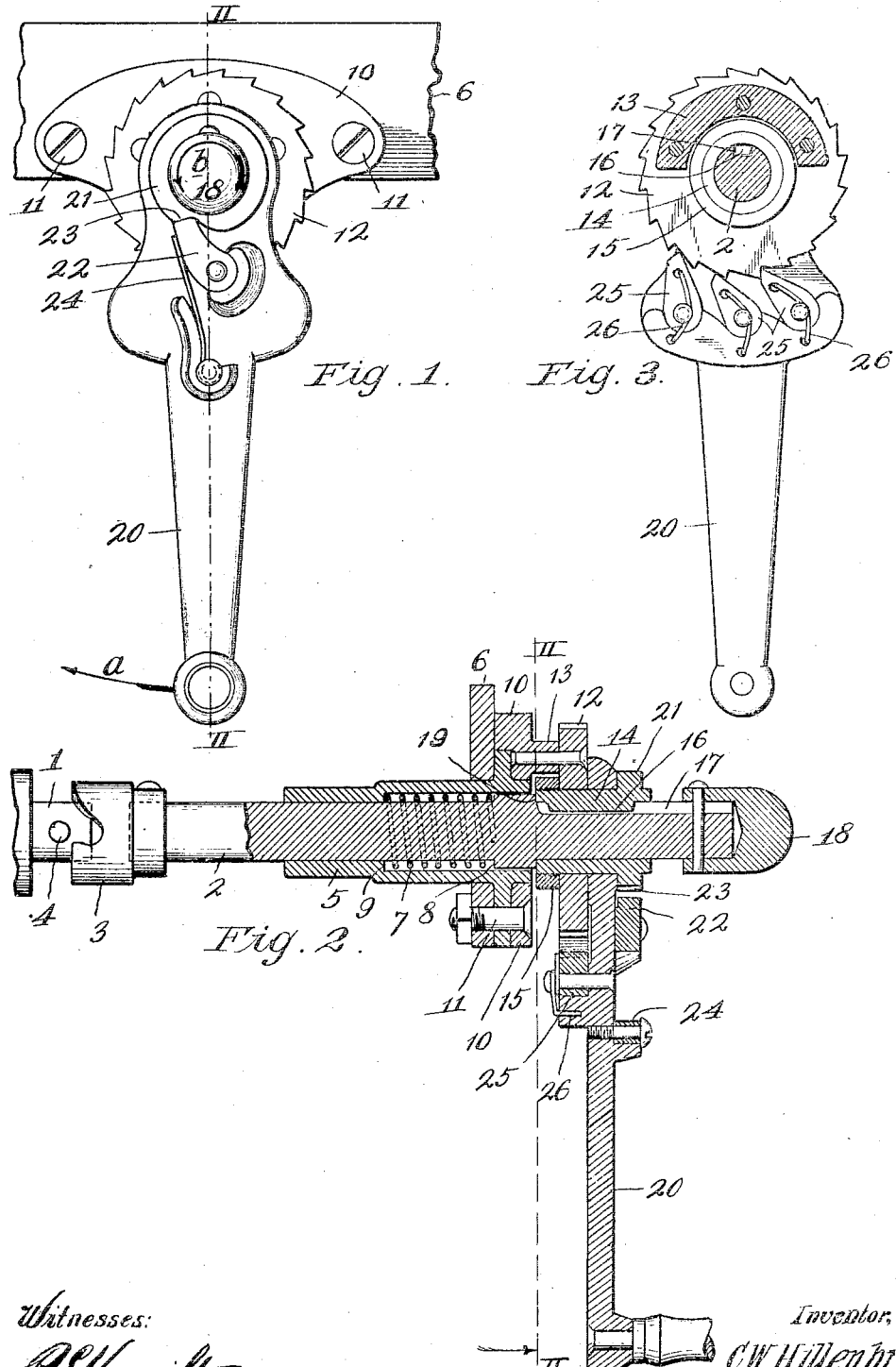

UNITED STATES PATENT OFFICE.

CHARLES W. HILLENBRAND, OF KANSAS CITY, KANSAS, ASSIGNOR TO NATHANIEL C. BARNES, OF KANSAS CITY, MISSOURI.

SAFETY DEVICE FOR CRANKING EXPLOSIVE-ENGINES.

953,831. Specification of Letters Patent. Patented Apr. 5, 1910.

Application filed August 12, 1909. Serial No. 512,582.

*To all whom it may concern:*

Be it known that I, CHARLES W. HILLENBRAND, a citizen of the United States, residing at Kansas City, in the county of Wyandotte and State of Kansas, have invented certain new and useful Improvements in Safety Devices for Cranking Explosive-Engines, of which the following is a specification.

My invention relates to a safety device for cranking explosive engines, and my object is to eliminate the danger arising from the back-kick of the engine while being cranked.

The device consists primarily of a crank for starting the engine, means to prevent backward rotation of said crank, and yielding means normally connecting the crank to the engine-shaft. Said yielding means offers sufficient resistance to lock the crank and the shaft together during the cranking operation, but should the engine back-kick during said operation the resistance of the yielding or locking means will be overcome by the force of said back-kick and permit the engine shaft to turn backward while the crank remains stationary, so that injury cannot result to the operator by reason of the crank flying backward.

In order that the invention may be fully understood, reference will now be made to the accompanying drawing, in which:

Figure 1 represents a front elevation of the device in position for operation. Fig. 2 is a central vertical section on line II—II of Fig. 1. Fig. 3 is a section on line III—III of Fig. 2.

1 designates the engine shaft, and 2 designates an extension thereof, the same being provided with a coupling member 3 adapted to engage a pin 4 on the shaft proper when it is desired to rotate the same for the purpose of cranking the engine. Extension 2 is journaled in a bearing 5 secured to the frame 6 of an automobile or other machine carrying the engine.

7 designates an expansion spring interposed between shoulders 8 and 9 on extension 2 and bearing 5, respectively, for the purpose of normally holding said extension in a forward position, so that its coupling 3 will not engage pin 4 when the engine is in operation.

10 designates a casting removably secured to frame 6 by a plurality of bolts 11, which also secure bearing 5 to said frame.

12 designates a stationary ratchet-wheel fixed to casting 10, which latter is provided with an integral, segmental flange 13 to space the ratchet-wheel from the main body thereof.

14 designates a sleeve journaled in the ratchet-wheel and held in position therein by a nut 15 arranged in the space between casting 10 and the ratchet-wheel 12, as shown in Fig. 2. Sleeve 14 loosely embraces extension 2 but causes the same to rotate therewith through the intermediacy of an integral spline 16 which extends into a slot 17. This arrangement permits extension 2 to slide in and out through bearing 5 and the sleeve 14, so that its coupling member 3 may engage or disengage pin 4 of the engine shaft, and in order that said extension may be slid backward against the pressure of spring 7, I provide its outer terminal with a knob 18. The outward movement of extension 2 is limited by its shoulder 19 contacting with the rear end of the sleeve, as shown in Fig. 2.

20 designates a crank for turning the sleeve and the shaft, said crank being loosely mounted upon the sleeve, and retained in position thereon by ratchet-wheel 12 and a peripheral flange 21, integral with the forward end of said sleeve. Crank 20 is provided at its front side with a pivotally-mounted detent 22 which is normally held in engagement with the notched portion 23 of flange 21, by means of a spring 24 carried by the crank. Crank 20 is provided at its rear side with a plurality of pawls 25 held in engagement with the ratchet-wheel 12 by springs 26, said pawls being so disposed that one of them will always be in engagement with the abrupt side of a ratchet-tooth, as shown in Fig. 3.

In order to start the engine, extension 2 is pushed inward until its coupling member 3 engages pin 4 when the crank 20 is rotated in the direction of arrow *a*. During this operation the crank and the shaft will be locked together through the intermediacy of flange 21, detent 22, and spring 24, so that the shaft will be caused to rotate with the crank, but should the engine back-kick and cause the shaft to turn backward in the direction of arrow *b*, the crank will be locked from flying backward therewith through the intermediacy of pawls 25 and the stationary ratchet-wheel 12. Backward rotation of the shaft will cause detent 22 to fly out of notch 23, and thus avoid injury to the device by reason of the crank remaining stationary while the shaft rotates backward.

Having thus described my invention, what I claim is:—

1. In a device of the character described, the combination with an engine-shaft having an extension adapted to be uncoupled therefrom, a bearing in which said extension is journaled, resilient means interposed between said bearing and the extension whereby the latter is normally held in an uncoupled position, a notched portion on said extension whereby it may be coupled to the shaft, a sleeve through which said extension may slide but is caused to turn therewith, a crank loosely mounted upon said sleeve, yielding means for locking the shaft and said crank together so that the latter may turn the former forward, a stationary ratchet-wheel loosely mounted upon the sleeve, and a pawl carried by the crank and engaging the ratchet-wheel to prevent the crank from turning backward.

2. In a device of the character described, the combination with an engine-shaft having an extension adapted to be uncoupled therefrom, a rotary sleeve through which said extension slidably extends, said sleeve being provided with means to engage and rotate the extension therewith, a stationary ratchet-wheel through which said sleeve extends, a crank loosely mounted upon the sleeve, means carried by said crank and yieldingly held in engagement with the sleeve to turn the latter in one direction with the crank, and means carried by the crank and yieldingly engaging the ratchet-wheel to prevent said crank from turning in a reverse direction.

3. In a device of the character described, the combination with an engine-shaft having an extension adapted to be uncoupled therefrom, a rotary sleeve through which said extension slidably extends, said sleeve being provided with means to engage and rotate the extension therewith, a notched flange on said sleeve, a stationary-ratchet-wheel through which said sleeve extends, a crank loosely mounted upon the sleeve, a detent pivoted to said crank, a spring carried by the crank to normally hold said detent in engagement with the notched portion of the flange, and a plurality of pawls carried by the crank and yieldingly engaging the ratchet-wheel to prevent said crank from turning backward.

4. In a device of the character described, the combination with an engine-shaft having an extension adapted to be uncoupled therefrom, a bearing through which said extension extends, an expansion spring interposed between said bearing and the extension to normally hold the latter outward in an uncoupled position from the shaft, a knob on said extension whereby it may be pushed inward into engagement with the shaft, a rotary sleeve through which said extension slidably extends, said sleeve being provided with means to engage and rotate the extension therewith, a stationary ratchet-wheel through which said sleeve extends, a crank loosely mounted upon the sleeve, means carried by said crank and yieldingly held in engagement with the sleeve to turn the latter in one direction with the crank, and means carried by the crank and yieldingly engaging the ratchet-wheel to prevent the crank from turning in a reverse direction.

In testimony whereof I affix my signature, in the presence of two witnesses.

CHARLES W. HILLENBRAND.

Witnesses:
  F. G. FISCHER,
  M. COX.